United States Patent [19]
Gozani

[11] Patent Number: 5,388,128
[45] Date of Patent: Feb. 7, 1995

[54] COMPOSITE CAVITY STRUCTURE FOR AN EXPLOSIVE DETECTION SYSTEM

[75] Inventor: Tsahi Gozani, Palo Alto, Calif.

[73] Assignee: Science Applications International Corporation, San Diego, Calif.

[21] Appl. No.: 931,835

[22] Filed: Aug. 18, 1992

Related U.S. Application Data

[60] Division of Ser. No. 508,235, Apr. 11, 1990, Pat. No. 5,162,096, which is a continuation of Ser. No. 54,329, May 26, 1987, abandoned.

[51] Int. Cl.⁶ .............................................. G21C 1/06
[52] U.S. Cl. .................... 376/159; 376/157
[58] Field of Search ................ 376/159, 157, 161

[56] References Cited

U.S. PATENT DOCUMENTS

| | | | |
|---|---|---|---|
| 3,832,545 | 8/1974 | Bartko | 376/159 |
| 5,006,299 | 4/1991 | Gozane et al. | 376/159 |
| 5,162,096 | 11/1992 | Gozani | 376/159 |

*Primary Examiner*—Donald P. Walsh
*Assistant Examiner*—Frederick H. Voss
*Attorney, Agent, or Firm*—Ellsworth R. Roston; Charles H. Schwartz

[57] ABSTRACT

A detector structure adjacent an opening in a cavity structure for detecting explosives in objects within such opening including a plurality of thin nonchlorinated hydrogenous wall members forming a passageway to define such opening. A source of high energy neutrons located adjacent the passageway to direct neutrons into the passageway. A premoderator formed by nonchlorinated hydrocarbon material surrounding the source of high energy neutrons to reduce the energy in at least a portion of the neutrons. A first moderator formed by heavy water surrounding the source of neutrons and the premoderator to reduce the energy in at least a further portion of the neutrons. A second moderator formed by carbonaceous material at least partially surrounding the plurality of thin hydrogenous wall members and the first moderator to reduce the energy in at least an additional portion of the neutrons and reflect back the additional portion of neutrons into the opening. The plurality of thin hydrogenous wall members additionally forming a thin moderator to additionally slow down high energy neutrons within the opening. The combination of the premoderator and the first, second and third moderators moderating the neutrons produced by the neutron source to form a spectrum of neutrons in the opening with a peak value in the thermal energy portion of the spectrum to maximize the detection of nitrogen by interacting the thermal neutrons with the nitrogen to produce gamma rays for detection by the detector structure.

32 Claims, 4 Drawing Sheets

COMPOSITE CAVITY STRUCTURE FOR AN EXPLOSIVE DETECTION SYSTEM

This invention was made with the support of the United States Government under contract DTFA03-85-C-00053 awarded by the Department of Transportation. The United States Government has certain rights in this invention.

This is a division of application Ser. No. 07/508,235 filed Apr. 11, 1990, which in turn is a continuation of application Ser. No. 07/054,329 filed May 26, 1987, now abandoned.

BACKGROUND OF THE INVENTION

FIELD OF THE INVENTION

The present invention relates to a cavity structure for use in a nitrogen, especially in an explosive detection system. Specifically, the present invention relates to a composite cavity structure which in combination with a source of neutrons produces a cloud of thermal neutrons within the cavity to provide for a more efficient detection of the nitrogen contained in an object (such as an explosive) within the cavity.

DESCRIPTION OF THE PRIOR ART

A great need exists for the scanning of luggage, baggage and other parcels for the detection of any explosive material contained or concealed within their confines. For example, a large number such as close to two million (2,000,000) pieces of luggage are checked and/or carried onto aircraft daily by close to seven hundred and fifty thousand (750,000) passengers within six hundred (600) airports extending across the country. There is a possibility, albeit remote, that any one piece of luggage or parcel may contain explosive material.

It is, therefore, desirable to protect the public by providing detection systems to scan luggage and parcels to detect the presence of any explosive material. Co-pending application Ser. No. 053,950 filed by Tsani Gozani and Patrick M. Shea on May 26, 1987 (now abandoned in favor of continuation Ser. No. 321,511 filed Mar. 9, 1989) for "Explosive Detection System" and assigned to the same assignee of the present application, is directed to an overall detection system to provide for the checking of luggage or parcels for explosives with a high probability of detection and a low probability of false alarms. It is appreciated that any system should have a high probability of detection in order to be effective.

It is also appreciated that any detection system, because of the large number of passengers, is bound to occasionally give a false alarm. The probability of these false alarms must be minimized in order to provide for an effective explosive detection system. This is true, because when an alarm occurs it is not known at that time whether is it proper or false. This means that each time an alarm occurs a passenger may be detained for further investigation. If false alarms are significantly high, the nuisance level and the delays can be unacceptable to passengers. It is, therefore, important that any explosive detection system should have a very high probability of detection and yet at the same time have a very low probability of false alarms. These conflicting criteria have hampered efforts in the past to build a reliable and usable system.

The prior art systems have not had the desired characteristics of having a high probability of detection with a low probability of false alarms. As an example, one such prior art system is shown in U.S. Pat. No. 3,832,545. This patent provides for a system for the detection of nitrogen which is generally present in the explosive materials to be detected. The object under observation is positioned within a cavity structure and is bombarded by thermal neutrons. The thermal neutrons react with any nitrogen contained in the object to provide for the emission of gamma rays at an energy level characteristic of the presence of nitrogen The emitted gamma rays are then detected by an array of gamma ray detectors.

The prior art U.S. Pat. No. 3,832,545 specifically provides for the use of liquid and plastic type organic scintillator detectors. These detectors are provided in an array to produce a two dimensional profile of the nitrogen content within the object being inspected. Co-pending application Ser. No. 053,950 filed by Tsahi Gozani and Patrick M. Shea on May 26, 1987 (now abandoned in favor of continuation Ser. No. 321,511 filed Mar. 9, 1989) for "Explosive Detection System" and assigned of record to the assignee of record of this application discloses and claims a system which is more effective than the system of U.S. Pat. No. 3,832,545. The system of co-pending application Ser. No. 321,511 provides for the use of inorganic scintillators as detectors. These inorganic detectors are formed as a C-ring so as to provide for a detection of a slice or plane of the object under inspection. The object is moved continuously through the C-ring of detectors so as to provide for a plurality of slices or parallel successive planes. The parallel successive planes may then be used to build a three dimensional profile of the concentration of the nitrogen contained within the object under inspection.

The composite cavity structure of the present invention may be used with either the prior art organic scintillators in an array or the C-ring array of inorganic scintillators shown in the co-pending application. However, the present invention is described with reference to the use of the C-ring array of inorganic scintillators of the co-pending application.

The detection of the explosive should be independent of the specific configuration and must be non-intrusive in order to protect privacy. The detection equipment, of course, must be non-hazardous to the contents of the checked items and to the operating personnel and environment. Other more general criteria are that the system must be reliable, easily maintained and operable by relatively unskilled personnel and that the cost must be low enough so as to be non-burdensome to airlines and airports. Finally, the size of the system must be relatively small so that the system may be useful in a wide variety of environments.

In order to develop a proper explosive detection system, an understanding of the properties of the various explosives are relevant to the specific techniques to be used. Although there are a large number of explosive types, a general classification into six major groups with minor variations, has been proposed. The proposed classification scheme includes the following types of explosives: (1) nitroglycerine based dynamites, (2) ammonium nitrate based dynamites, (3) military explosives, (4) homemade explosives, (5) low order powders, and (6) special purpose explosives.

In general, all of these explosives contain a relatively high amount of nitrogen concentration ranging from nine to thirty five percent by weight and with a normal concentration range between fifteen to thirty five percent with twenty percent as a typical value. The nominal density of these explosives is typically 1.6 g/cm$^3$ and with a range from 1.25 to 2 g/cm$^3$ or more. These physical properties demonstrate that the most unique signature of explosives is the high concentration and density of the nitrogen content.

In can be seen, therefore, that a nuclear detection technique can provide for the detection of the nitrogen content to reliably indicate the presence of a large nitrogen content. However, the universal occurrence of nitrogen in non-explosive materials limits the level of detection sensitivity and merely detecting the presence or absence of nitrogen alone is not sufficient. Therefore, additional information is required beyond simply sensing the presence of the nitrogen. The present invention provides for a composite cavity structure which enhances the production of this additional information using specific structures and materials for the cavity.

SUMMARY OF THE PRESENT INVENTION

The basis for the explosive detection system incorporating the composite cavity structure of the present invention is the use of neutrons from a radioisotope or an electronic neutron generator, which neutrons are then slowed down within the cavity structure to create a cloud of low energy thermal neutrons within the cavity structure. The luggage or other parcels are passed through the cavity and the thermal neutrons react with the variety of nuclei in the luggage or parcels including nitrogen and produce characteristic high energy gamma rays which may then be detected by external detectors. The output signals from the detectors may then be analyzed to detect the presence and concentration of the nitrogen content and with particular concentrations in particular profiles indicating the presence of explosive material.

The present invention relates to the specific structure of the cavity so as to maximize the production and spectrum of the thermal neutrons and so as to provide for an enhancement of the information from the detectors. The specific cavity structure may include the use of different layers of particular moderator materials so as to slow down fast neutrons produced by the source of neutrons. The various moderators affect different portions of the spectrum of neutrons initially produced by the source of neutrons to slow down these different portions of the spectrum to maximize the number of thermal neutrons within the cavity.

In the specific arrangement of the cavity structure of the present invention, the source of neutrons is surrounded by a moderator material, such as heavy water, which slows down any neutrons having a speed in the portion of the spectrum above the energy of thermal neutrons and thereby slows down these neutrons into the thermal neutron portion of the spectrum. A premoderator material may surround the source of neutrons to slow down a portion of the spectrum and assist the heavy water modulator to further slow down the neutrons to the thermal neutron portion of the spectrum. The premoderator may be formed of nonclorinated hydrocarbon material such as polyetheyne or acrylic resin.

The source of neutrons may also be surrounded by a shield, such as a shield composed of a heavy metal such as bismuth, lead, tungsten, depleted uranium, etc. This shield is specifically used to absorb unwanted gamma rays that may be produced from the source. These unwanted gamma rays can hamper the performance of the system, so it is important to absorb any of these unwanted gamma rays that are along a direct line from the radiation or neutron source to the detectors.

The source of neutrons, plus the premoderator, heavy water and heavy metal shield, is located immediately adjacent a cavity opening through which the luggage or baggage is passed. The cavity opening is defined by hydrogenous material such as thin rigid nonclorinated hydrocarbon material. This thin rigid material may be thin sheets of polyethylene or acrylic which provide for low friction walls to guide the luggage, baggage, etc. through the passageway. The thin plastic walls will reflect the neutrons so that the thermal neutrons cloud will be contained within the cavity structure to interact with the object under observation.

Surrounding the cavity opening formed by the sheets of thin hydrogenous material are other moderator materials which moderate higher energy neutrons and slow down these higher energy neutrons while at the same time reflecting them back within the cavity opening. This additional material may include a first mass of carbonaceous material such as graphite which as indicated above, tends to slow down higher energy neutrons. The carbonaceous material also has the effect of making the flux spectrum of the neutrons more uniform. Surrounding the carbonaceous material are additional layers of moderator-absorbing material such as a layer of hydrogenous material, with boron or lithium embedded material. As an example, the embedded material may be borated paraffin and may be used to absorb any neutrons moving from the cavity volume. At the same time the borated paraffin may slow down some of the high energy neutrons and reflect them back for moderation by the graphite material and for ultimate return within the cavity opening. As an alternative to the use of borated paraffin, other hydrogenous materials, such as acrylic resin, polyethylene, water etc. mixed with boron or lithium compounds may be used. The borated paraffin is preferred since it is the effective, relatively inexpensive and compact.

In addition to the use of the various moderator materials to provide for an enhancement of the thermal neutrons and also to provide for a desirable spectrum of the neutrons, it is also important to insure that the detectors receive the gamma rays of interest but do not receive undesired neutrons. This is accomplished by shielding the sides of the detectors with a heavy metal shield material, such as lead etc. and providing for a window at the front of the detectors to stop neutrons while allowing the passage of gamma rays. This window may be constructed of an epoxy material, such as an epoxy containing boron or lithium compounds. As an example, the window may be formed of boron carbide embedded in epoxy.

The cavity structure of the present invention thereby includes a cavity opening defined by the thin rigid hydrocarbon walls for receiving the passage of objects under inspection. A source of neutrons is located adjacent this cavity opening and detection means are also located adjacent the cavity opening. The detection means are protected by lead shields and boron carbide epoxy windows to insure that the detection means receive the proper gamma rays representative of the concentration of nitrogen contained in the object under observation.

The composite cavity structure also includes a number of layers of moderator material to maximize the cloud of thermal neutrons within the cavity opening and to enhance the spectrum of the neutrons within the cavity opening to optimize the production of gamma rays from any nitrogen within the object under inspection. The additional moderator materials include polyethylene, heavy water, graphite and borated paraffin and also with the use of a shield composed of bismuth. This chamber structure provides for an enhanced operation of a detection system as disclosed in the co-pending application referred to above, but the composite cavity structure may also be used to enhance the detection of nitrogen in other types of detect ion systems.

The composite cavity structure also includes a provision for a conveyor belt or other means to transport luggage and packages through the cavity. The belt is constructed of non-chlorinated, non-metallic materials, of which there are several.

BRIEF DESCRIPTION OF THE DRAWINGS

A clearer understanding of the present invention will be had with reference to the following description and drawings wherein:

FIG. 1 illustrates a perspective view of a luggage and parcel inspection system including the composite cavity structure of the present invention;

FIGS. 4(a), (b), (c), and (d) illustrate various neutron spectrums useful in describing the operation of the composite cavity structure.

DESCRIPTION OF THE PREFERRED EMBODIMENT

Figures 1, 4A, 4B:
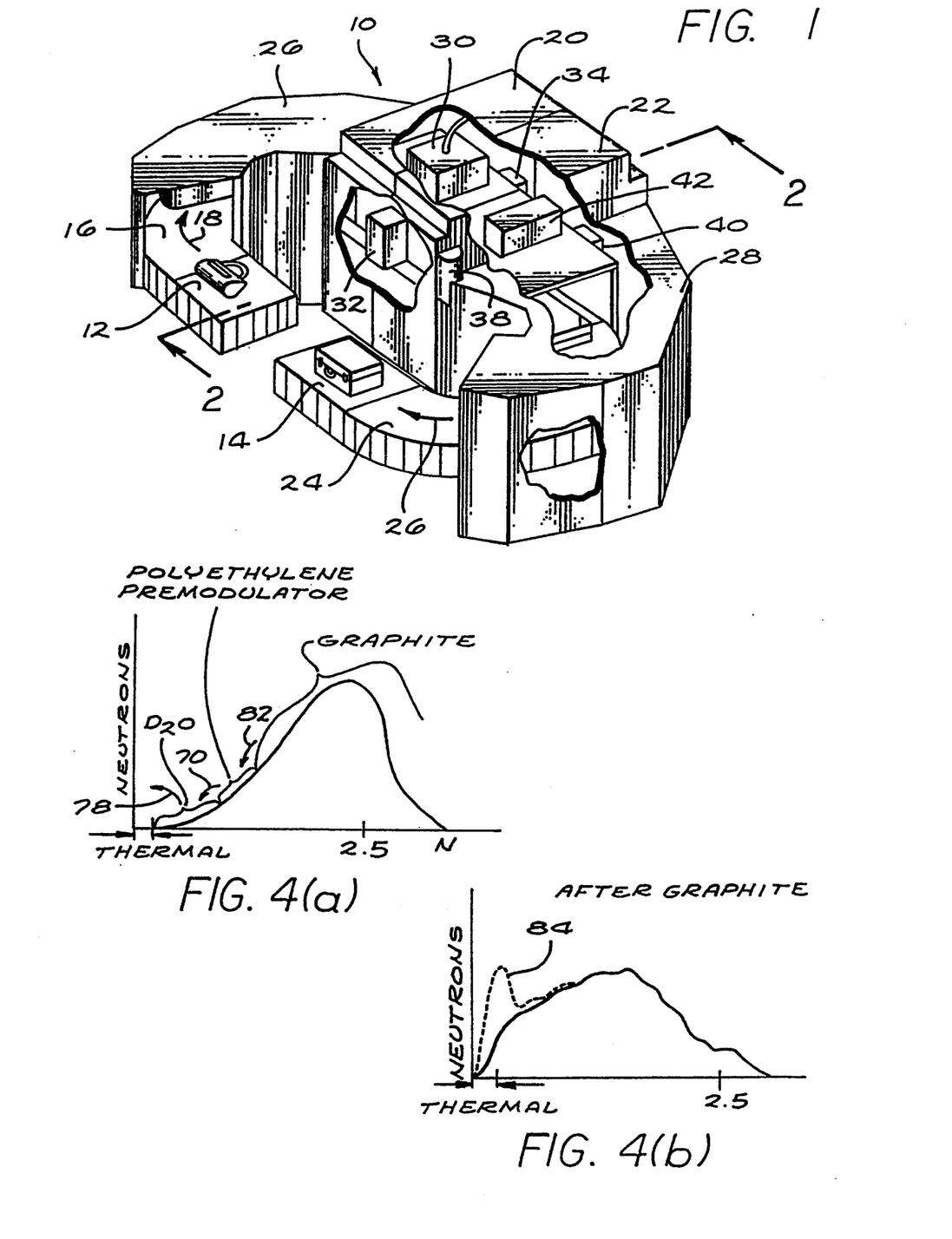
Figure 2:
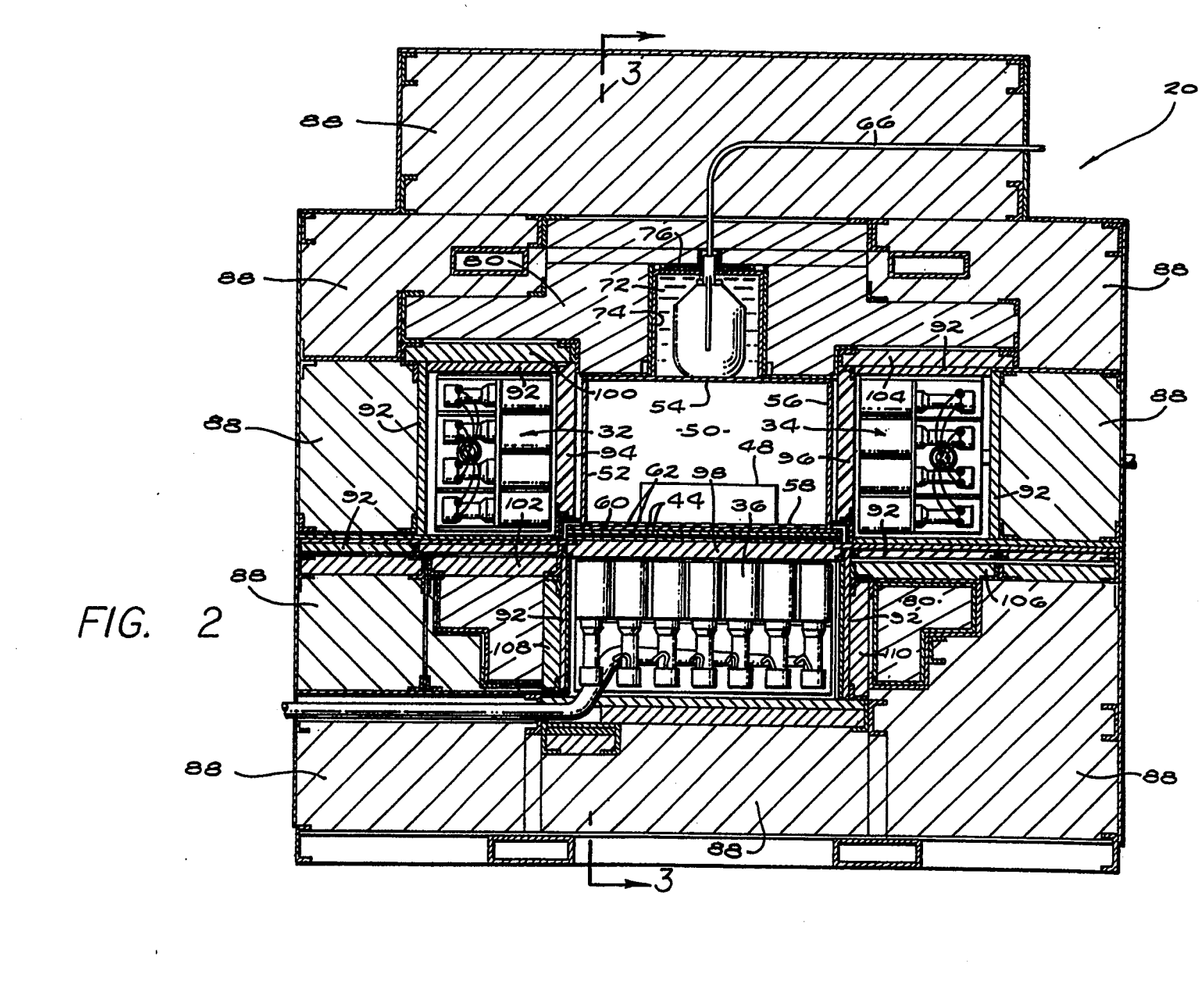
FIG. 2 is a cross sectional view of the composite cavity structure taken along lines 2—2 of FIG. 1.
Figure 3:
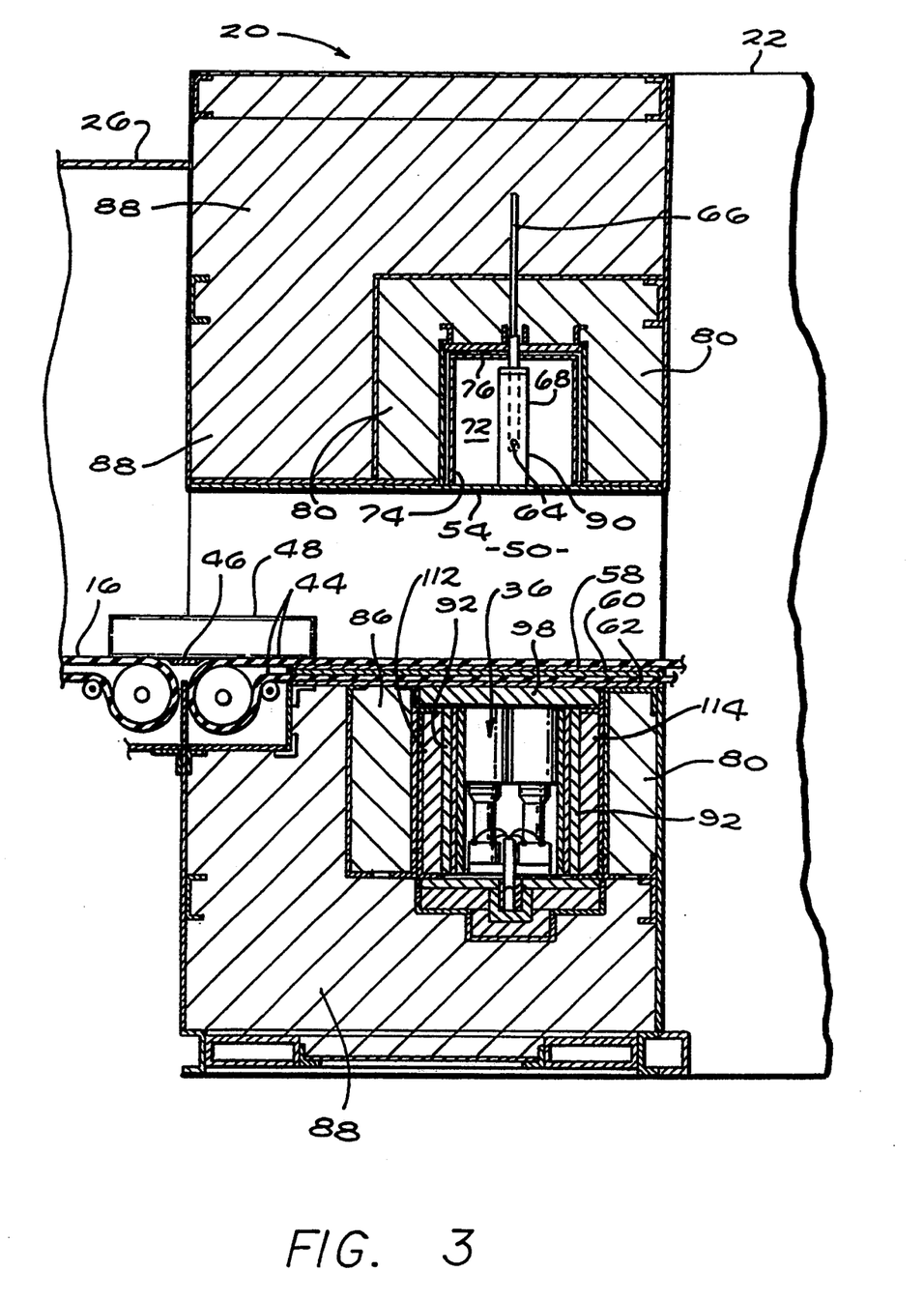
FIG. 3 is a cross sectional structure taken along lines 3—3 of FIG. 2.

As shown in FIG. 1, an explosive detection system 10 includes a loading station 12 and an unloading station 14. The loading station 12 leads to an input conveyer belt 16 having a motion as shown by the arrow 18. Adjacent the input conveyer belt 16 is a first cavity structure module 20. A second cavity structure module 22 is located adjacent to the first cavity structure module 20 and adjacent to the second cavity structure module 22 is an output conveyer belt 24 having a motion as shown by the arrow 26. The output conveyer belt 24 extends to the unloading station 14. Internal to the cavity structure modules 20 and 22 are conveyer means which interconnect the conveyer belts 16 and 24. The internal conveyer means is shown in FIGS. 2 and 3. Extending from the cavity structure modules 20 and 22 are shield members 27 and 28 which shield members enclose the conveyer belts 16 and 24 and prevent access to the interior of the cavity structure modules 20 and 22.

FIGS. 2 and 3 illustrate in more detail cross sectional views of the cavity structure module 20, but is to be appreciated that FIGS. 2 and 3 are also illustrative of the cavity structure module 22 but with the following exception. As shown in FIG. 1 in the broken away portion, cavity structure 20 includes a source of neutrons 30 located at a top position, detector structures 32 and 34 located at side positions and a further detector structure 36, as shown in FIG. 2, located at a bottom position. Cavity structure module 22 includes an opposite structure having side detector structures 38 and 40 and with a top detector structure 42 and with a bottom source of neutrons. (not shown).

The groups of detector structures provide for a C-ring configuration, the C-ring of detectors in the cavity modules 20 and 22 having their open ends facing each other so as to essentially form a complete ring if the output signals from the two C-rings of detectors are combined electronically. As indicated above, although the invention is described with reference to a particular configuration for the detectors as shown in the drawings, it is to be appreciated that other types of detector arrays may be used and that the invention is not to be limited to the particular C-ring configuration for the detectors.

Figure 5:
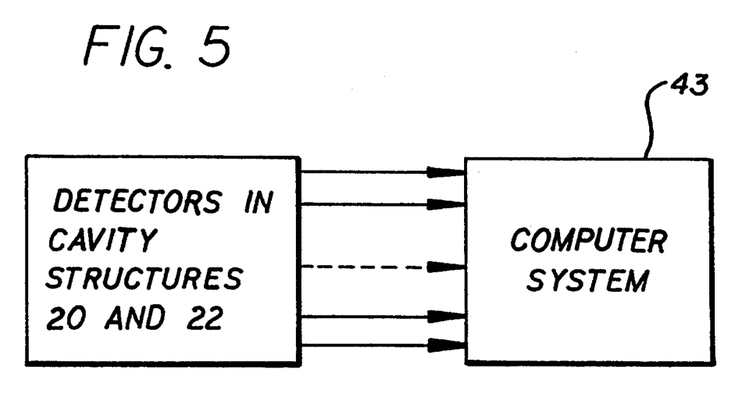
FIG. 5 is a schematic block diagram of the electrical features of the invention.

The signals from the detectors in the cavity structures 20 and 22 are introduced to a computer system 43 (FIG. 5) for processing the signals to provide a profile of the three-dimensional concentration of the element such as nitrogen at different positions of the object to be detected. The computer system 43 is shown in some detail in FIG. 8 of application Ser. No. 321,511 and is disclosed in detail in that pending application.

Turning now to FIGS. 2 and 3, a more detailed view of the cavity structure is shown. Extending through the cavity structure is a conveyer belt 44. The conveyer belt 44 is located adjacent to the input conveyer belt 16 at an input end and adjacent the output conveyer belt 24 at an output end. This allows the various portions of the entire detector structure to be built in modular form so that the system may be easily transported for set up at a desired location. A plate member, such as plate member 46 may be used to bridge the space between the input and conveyer belt 16 and the conveyer belt 44 extending through the cavity structure. A similar plate member would be used the bridge the space between the conveyer belt 44 and the output conveyer belt 24.

As shown in FIG. 3 a piece of luggage, such as luggage 48, is shown entering the cavity structure for inspection. The piece of luggage 48 or any other luggage, baggage or parcels to be inspected is passed through an opening 50 defined by thin walls 52 through 58 of hydrogenous material such as a rigid nonclorinated hydrocarbon material. A preferred material is polyethylene but other material such as acrylic resin may be used. The thin polyethylene walls help contain low energy neutrons. Specifically, the cavity 50 will tend to retain a cloud of thermal neutrons within the cavity for interaction with an object under inspection such as the piece of luggage 48.

The upper surface of the conveyer 44, which supports the objects for inspection, is supported by the bottom thin plastic wall 58. Additionally, the lower portion of the conveyer 44 is supported for return by a pair of spaced bearing layers 60 and 62. This above described structure provides for a smooth movement of the conveyer belt 44 through the cavity opening 50 to thereby smoothly and continuously move objects under observation through the cavity 50.

In order to produce the desired cloud of thermal neutrons within the cavity 50, a source of neutrons is used such as either a radioactive or electronic neutron source. As shown in FIGS. 2 and 3, a radioactive source 64 is supported at the end of a rod 66 so that the source 64 of neutrons may be inserted into the cavity structure at a position adjacent to the cavity opening 50. The source of neutron 64 may produce a variety of neutrons that would typically have a flux pattern as shown in FIG. 4(a). As can be seen in FIG. 4(a) the maximum production of neutrons is at approximately 2.5 MeV, the majority of the neutrons in the flux pattern ranging between 2 to 4 MeV. Also as can be seen in FIG. 4(a), the desired thermal neutrons are at a point outside the normal flux pattern and it is, therefore, necessary to slow down most of the neutrons in the flux pattern to the thermal neutrons area which is at the position designated in FIG. 4(a).

In order to accomplish slowing down of the neutrons it is desirable to use a variety of moderators to affect different portions of the flux pattern shown in FIG. 4(a). These different portions of the flux pattern are marked on FIG. 4(a) and with these different portion effected by specific portions of the cavity structure shown in FIGS. 2 and 3. Specifically, surrounding the radioactive source 64 for producing the neutrons is a sleeve of nonclorinated hydrocarbon material 68 (FIG. 3) such as polyethylene material. This sleeve of polyethylene material acts as a premoderator and affects a portion of the flux shown FIG. 4(a) and moderates this portion to a lower energy, as shown by the arrow 70.

Surrounding the polyethylene premoderator 68 is heavy water 72. The heavy water 72 is disposed in a container formed by the upper wall 54 of the cavity. 50, plus a cylindrical member 74 and end plate 76. The heavy water 72 serves to slow down neutrons within the portion shown in FIG. 4(a) and to convert these neutrons to neutrons in the thermal energy range as shown by arrow 78. The heavy water 72 is positioned immediately adjacent the source 64 so as to maximize the effectiveness of the heavy water while at the same time minimizing the amount of heavy water that has to be used.

Surrounding the cavity 50 at a position adjacent to the cavity and the radiation source 64 are large portions of carbonaceous material such as graphite material. All of the graphite material is marked with reference numeral 80. The graphite material 80 affects the portion of the flux field as shown in FIG. 4(a) and slows down neutrons in this portion of the flux field as shown by the arrow 82. As a substitute for the graphite material, other carbonaceous material such as polyethylene may be used. This will affect the flux pattern as will be described at a later portion of this specification.

It can, therefore, be seen that all of the various types of moderator material slow down the neutrons to the desired thermal energy range, each moderator acting on different portions of the spectrum to progressively reduce the energy to build and enhance the cloud of thermal neutrons within the cavity 50. This can be seen initially in FIG. 4(b) which illustrates the effect of the cavity structure, but not including the moderating effect of the polyethylene thin wall liner formed by the walls 52 to 58. As can be seen in FIG. 4(b), a thermal portion of the neutron spectrum is shown in dotted lines 84. In addition, the graphite material 80 has greatly reduced the energy for the vast bulk of the neutrons in the spectrum.

Figure 4C:
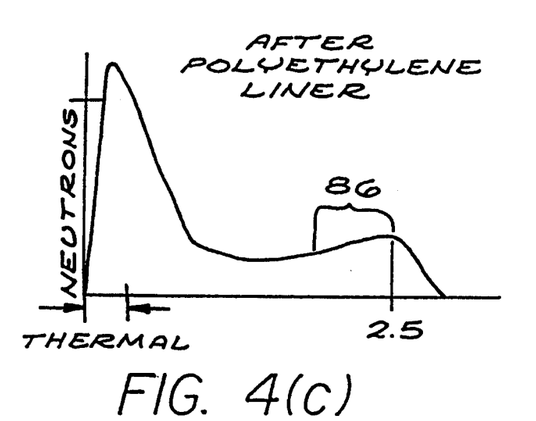

FIG. 4(c) shows the effect of the structure including the polyethylene thin walls 52 to 58 forming the polyethylene liner for the cavity 50. As shown in FIG. 4(c), a large percentage of the neutrons are now in the desired thermal energy range and a much smaller percentage are at higher energies. However, the composite preferred embodiment of the cavity of the present invention does not completely moderate all of the neutrons to the thermal neutron range, but leaves a small portion of the neutron spectrum at higher energys, such as in the area 86 in FIG. 4 (c).

The neutrons at this higher energy are useful to help provide a detection of particular types of explosives. Specifically, neutrons at this higher energy can easily penetrate luggage and thermalize in the explosive. This has the effect of making it harder to shield the explosive. These higher energy neutrons are particularly useful for detecting explosives that have a high hydrogen content. Many low nitrogen explosives typically include a relatively high content of hydrogen and the neutrons at the higher energies react with the hydrogen content in the explosive so that the explosive itself acts as a moderator to thermalize the neutrons.

Since the explosive itself acts as a moderator, this produces a high level of thermal neutrons within the explosive to thereby increase the reaction with the smaller amount of nitrogen. This tends to increase the number of gamma rays from the smaller nitrogen content. This in turn produces a relatively larger amount of detectable gamma rays than would normally be produced with this low nitrogen content explosive.

It is thereby preferable to produce a neutron spectrum as shown in FIG. 4(c) which includes some high energy neutrons in addition to the high level of thermal neutrons so as to detect not only explosives with a high nitrogen content, but also explosives with a high hydrogen content. In addition, as indicated above, the higher energy neutrons can more easily penetrate any shielding material so that the preferred cavity structure can more efficiently detect explosives even when there has been a deliberate attempt to shield the explosive material.

Surrounding the various layers of moderator material described above are layers of hydrogenous material generally marked with reference numeral 88. This hydrogenous material may be, for example, borated paraffin. As a substitute for the borated paraffin, other hydrogenous material, such as polyethylene, plexiglas, water etc. mixed with lithium compound may be used. These additional layers 88 of hydrogenous material provide for the final shielding of personnel operating the equipment. This mixed hydrogenous material absorbs any stray neutrons which escape the other layers of moderator material. The layers 88 of hydrogenous material may also tend to reflect some high energy neutrons back into the cavity structure, but primarily this material is used to provide for personnel shielding.

Figure 4D:
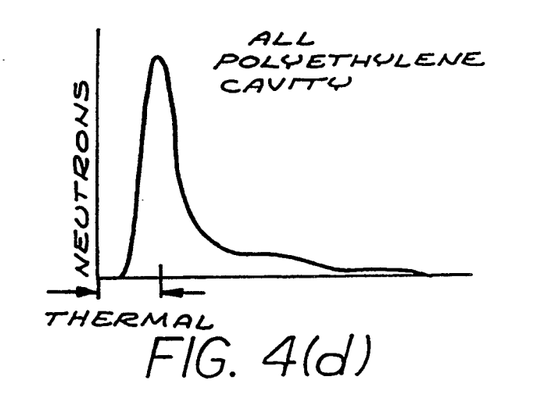

FIG. 4(d) illustrates an alternative cavity structure wherein a hydrocarbon material such as polyethylene or other plastic material is substituted for the graphite. While this type of cavity structure tends to even further slow down the high energy neutrons, as shown in FIG. 4(d), it does not produce a greater amount of thermal neutrons. As indicated above, a neutron spectrum, such as shown in FIG. 4(c) is preferable, but a composite cavity structure using polyethylene instead of the graphite to produce a spectrum as shown in FIG. 4(d) may also be useful in some situations.

In addition to the various moderator materials described above, the present invention may also include a shield member 90, which shield member surrounds the premoderator 68 and is located within the heavy water 72. The shield member 90 may be constructed of a heavy metal such as bismith and is specifically used to shield the detectors located around the cavity 50 from unwanted gamma rays produced by the radiation source 64. These unwanted gamma rays are harmful to the detectors when they are in line with any of the detectors. In order to absorb these unwanted gamma rays, the shield member 90 has a configuration to lie within substantially the same plane as the detectors. In this way, the shield members 90 will absorb these unwanted gamma rays which are in line and would be directly received by a detector. As a substitute for the bismuth, other heavy metals such as lead or tungsten can be used.

The detector structures are arranged in a C-ring around the cavity 50, the detectors and the source 64 of neutrons being disposed in a common plane. Specifically, the detector structures 32 and 34 are located along the sides of the cavity 50 and the detector structure 36 is located below the cavity structure 50. As can be seen in FIG. 2, the detector structures 32 and 34 include a plurality of detectors arranged in a column and the detector structure 36 includes a plurality of detectors arranged in a row. Actually, two adjacent columns and two adjacent rows are provided so that detector structure 32 includes two adjacent columns of four detectors each and with a similar structure for detector structure 36 and with bottom detector structure 36 including two adjacent rows each with seven detectors. In a preferred form of the detection system as described in the co-pending application, the individual dectectors are formed by inorganic scintillators, such as sodium iodide scintillators.

Each detector structure is shielded by heavy metal material such as lead shields, all of which are generally designated by reference character 92. In this way, all sides of the detector structures are shielded from the reception of unwanted gamma rays with the exception of a front window which allows for the reception of the desired gamma rays. The shields 92 are formed of a heavy metal, such as lead, tungsten, bismuth, etc. so as to insure that no gamma rays can enter the detector structures 32, 34 and 36 except through the front window.

Detector structure 32 includes a window member 94 positioned in front of the detector structure so that any gamma rays representative of nitrogen will pass through the window 94 to impinge on the plurality of detectors forming the detector structure while preventing the passage of neutrons. Similarly, detector structure 34 includes a window 96 and detector structure 36 includes a window 98. The windows 94, 96 and 98 may be composed of an hydrocarbon mixture such as an hardened epoxy resin mixed with boron carbide. This type of material provides for the passage of the gamma rays representative of nitrogen which would be the gamma rays at approximately 10.8 MeV. In order to properly shield the detector structures from neutrons, a similar epoxy boron carbide mixture is used to surround and support the detector structures. This may be seen, for example, by the use of the epoxy material 100 and 102 adjacent to the detector structure 32, the epoxy material 104 and 106 adjacent to the detector structure 34 and epoxy material 108 and 110 adjacent to detector structure 36. These materials represent the epoxy material along two sides of the detector structures, but similar epoxy material such as epoxy material 112 and 114 shown in FIG. 3 would also be along the other two sides.

The present invention, therefore, provides for a composite cavity structure including a cavity opening for receiving and supporting a conveyer belt to move objects under inspection through the cavity opening. The cavity opening is subjected to cloud of neutrons having a flux spectrum including mostly thermal neutrons and some neutrons at higher energy so as to produce an enhanced detection of nitrogen contained in explosives having both a high and low content of nitrogen.

Initially, neutrons are produced from a source, the initial spectrum of neutrons predominantly containing neutrons that are at high energy. A composite cavity includes a plurality of moderator means including a premoderator located adjacent the radiation source to slow down a portion of the flux spectrum and a heavy water moderator to further moderate neutrons to the desired thermal energies. In addition, the composite cavity includes a relatively large quantity of graphite which tends to flatten out the flux spectrum and to in general produce a large quantity of the neutrons to a lower energy. The graphite moderator, therefore, not only reduces the energy of the neutrons, but also makes the flux pattern more uniform.

The cavity opening is defined by a thin polyethylene wall liner which serves as a moderator to confine the thermal neutrons and to provide a low friction surface in case the luggage rubs it. Higher energy neutrons can escape and be moderated by the graphite so that the total combination produces the desired spectrum for the detection of nitrogen. The preferred flux spectrum includes a small fraction of neutrons at higher energies and this is desirable since some of the higher energy neutrons are the finalized in the explosive since the explosive itself can act as a moderator. This is particularly useful for explosives which do not have a high nitrogen content. The higher energy neutrons react with the hydrogen in this low nitrogen type of explosive and are moderated by the hydrogen to lower energy thermal neutrons. This increases the number of thermal neutrons that can react with the available nitrogen to increase the production of gamma rays. Because of the close proximity between these newly created thermal neutrons and the smaller amount of nitrogen, this enhances the output to the detector even from explosives having a relatively low concentration of nitrogen.

The composite cavity also includes the use of a mixed hydrogenous material such as borated paraffin to provide for a final shield structure for any personnel operating the equipment. The composite cavity is also constructed in a modular form to provide ease of construction and also ease of access to the various detector structures.

Although the invention has been described with reference to a particular embodiment, it is to be appreciated that various adaptations and modifications may be made and the invention is only to be limited by the appended claims.

I claim:

1. A composite cavity structure for detecting nitrogen in objects within a passageway in the cavity structure, including a source of high energy neutrons, the source being disposed adjacent the passageway to direct neutrons into the passageway, a plurality of nonchlorinated hydrogenous wall members disposed relative to one another to reduce the energy in at least a portion of the high energy neutrons passing into the passageway, premoderator means formed for nonchlorinated hydrogenous material, the premoderator means being disposed adjacent the passageway and at least partially enveloping the source of high energy neutrons to reduce the energy in at least a portion of the neutrons, first moderator means formed by heavy water, the first moderator means being disposed adjacent the passageway and being disposed relative to the source of neutrons and the premoderator means to reduce the energy in at least a further portion of the neutrons, second moderator means formed by carbonaceous material, the second moderator means being disposed adjacent the passageway and being disposed relative to the first moderator means to reduce the energy in at least an additional portion of the neutrons and to provide for the movement of the additional portion of neutrons into the passageway, and the combination of the premoderator means and the first and second moderator means and the nonchlorinated hydrogenous wall members moderating the neutrons produced by the neutron source to obtain the production of neutrons of reduced energy and to provide for an interreaction of the neutrons of the reduced energy with the nitrogen in the objects to produce gamma rays, and detector means disposed adjacent the passageway for detecting the gamma rays produced by the interreaction of the neutrons of the reduced energy with the nitrogen in the object.

2. The composite cavity structure of claim 1 additionally including outer shield means disposed relative to the second moderator means to inhibit the passage of unwanted gamma rays to the detector means.

3. The composite cavity structure of claim 2 wherein the outer shield means is constructed of a hydrogenous material mixed with a material selected from the group consisting of boron and lithium.

4. The composite cavity structure of claim 3 wherein the outer shield means is constructed of a borated paraffin.

5. The composite cavity structure of claim 1 wherein the hydrogenated wall members are formed from a material selected from the group consisting of polyethylene and acrylic resin.

6. The composite cavity structure of claim 3 wherein the hydrogenous wall members are formed from polyethylene.

7. The composite cavity structure of claim 1 wherein the premoderator means is formed from a material selected from the group consisting of polyethylene and acrylic resin.

8. The composite cavity structure of claim 7 wherein the premoderator means is formed from polyethylene.

9. The composite cavity structure of claim 1 wherein the second moderator means is formed from a material selected from the group consisting of graphite, polyethylene and acrylic resin.

10. The composite cavity structure of claim 9 wherein the second moderator means is formed from graphite.

11. The composite cavity structure of claim 1 additionally including a shield member composed of heavy metal, the shield member being disposed relative to the premoderator means for absorbing unwanted gamma rays to prevent such gamma rays from being directed to the detector means.

12. The composite cavity structure of claim 11 wherein the shield member is formed from a material selected from the group consisting of bismuth, lead, tungsten and depleted uranium.

13. The composite cavity structure of claim 12 wherein the shield member is formed from bismuth.

14. The composite cavity structure of claim 1 additionally including a shield member formed from a heavy metal, the shield member being disposed relative to the detector means to shield the detector means from unwanted gamma rays.

15. The composite cavity structure of claim 14 wherein the shield member is formed from lead.

16. The composite cavity structure of claim 1 additionally including a window member positioned in front of the detector means to prevent the passage of neutrons to the detector means while providing for the passage to the detector means of gamma rays representative of the presence of nitrogen in the passageway.

17. The composite cavity structure of claim 16 wherein the window member is formed from a hydrogenous material mixed with a material selected from the group consisting of boron and lithium.

18. The composite cavity structure of claim 17 wherein the window member is formed from a borated epoxy.

19. A composite cavity structure for detecting nitrogen in objects within a passageway in the cavity structure, the nitrogen in the object having properties of producing gamma rays when subjected to thermal neutrons of reduced energy, including, a source of neutrons of high energy, the source being located adjacent the cavity structure, first moderator means disposed within the cavity structure and following the contour of the cavity structure and disposed relative to the neutron source, and having characteristics, for reducing the energy in the thermal neutrons and for providing for the movement of the thermal neutrons of reduced energy into the cavity structure, second moderator means disposed within the cavity structure and enveloping the first moderator means and following the contour of the cavity structure and having characteristics for reducing the energy in the neutrons passing through the cavity structure and for providing for the movement of the thermal neutrons of the reduced energy through the cavity structure to the object, and detector means responsive to the thermal neutrons of the reduced energy for detecting the gamma rays produced by the nitrogen in the object as a result of the movement of the thermal neutrons of the reduced energy to the object.

20. A composite cavity structure for detecting nitrogen in objects within a passageway in the cavity structure, the nitrogen in the object having properties of producing gamma rays when subjected to thermal neutrons of reduced energy, including, a source of thermal neutrons of high energy, the source being located adjacent the cavity structure, first moderator means disposed at a position adjacent the cavity structure and disposed relative to the neutron source, and having characteristics, for reducing the energy in the thermal neutrons and providing for the movement of the thermal neutrons of reduced energy into the cavity structure, second moderator means disposed relative to the cavity structure and having characteristics for reducing the energy in the thermal neutrons passing through the cavity structure to the second moderator means and providing for the movement of the thermal neutrons of the reduced energy through the cavity structure to the object, and detector means for detecting the gamma rays produced by the nitrogen in the object as a result of the movement of the thermal neutrons of the reduced energy to the object, shielding means disposed relative to the first moderator means, and having characteristics, for shielding the detector means from gamma rays passing through the first moderator means.

21. A composite cavity structure for detecting nitrogen in objects within a passageway in the cavity structure, the nitrogen in the object having properties of producing gamma rays when subjected to thermal neutrons of reduced energy, including, a source of thermal neutrons of high energy, the source being located adjacent the cavity structure, first moderator means disposed at a position adjacent the cavity structure and disposed relative to the neutron source, and having characteristics, for reducing the energy in the thermal neutrons and providing for the movement of the thermal neutrons of reduced energy into the cavity structure, second moderator means disposed relative to the cavity structure and having characteristics for reducing the energy in the thermal neutrons passing through the cavity structure and providing for the movement of the thermal neutrons of the reduced energy through the cavity structure to the object, and detector means for detecting the gamma rays produced by the nitrogen in the object as a result of the movement of the thermal neutrons of the reduced energy to the object, shielding means disposed relative to the second moderator means, and having characteristics, for shielding the detector means from thermal neutrons passing through the second moderator means.

22. A composite cavity structure for detecting nitrogen in objects within a passageway in the cavity structure, the nitrogen in the object having properties of producing gamma rays when subjected to thermal neutrons of reduced energy, including, a source of thermal neutrons of high energy, the source being located adjacent the cavity structure, first moderator means disposed at a position adjacent the cavity structure and disposed relative to the neutron source, and having characteristics, for reducing the energy in the thermal neutrons and providing for the movement of the thermal neutrons of reduced energy into the cavity structure, second moderator means disposed relative to the cavity structure and having characteristics for reducing the energy in the thermal neutrons passing through the cavity structure and providing for the movement of the thermal neutrons of the reduced energy through the cavity structure to the objects and detector means for detecting the gamma rays produced by the nitrogen in the object as a result of the movement of the thermal neutrons of the reduced energy to the object, means disposed relative to the detector means for shielding the detector means from unwanted gamma rays, and means disposed adjacent the detector means and between the detector means and the object for providing for the detection by the detector means of only the gamma rays from the nitrogen in the object.

23. A composite cavity structure for detecting nitrogen in objects within a passageway in the cavity structure, the nitrogen in the object having properties of producing gamma rays when subjected to thermal neutrons of reduced energy, including, a source of thermal neutrons of high energy, the source being located adjacent the cavity structure, first moderator means disposed at a position adjacent the cavity structure and disposed relative to the neutron source, and having characteristics, for reducing the energy in the thermal neutrons and providing for the movement of the thermal neutrons of reduced energy into the cavity structure, second moderator means disposed relative to the cavity structure and having characteristics for reducing the energy in the thermal neutrons passing through the cavity structure and providing for the movement of the thermal neutrons of the reduced energy through the cavity structure to the object, and detector means for detecting the gamma rays produced by the nitrogen in the object as a result of the movement of the thermal neutrons of the reduced energy to the object, the first moderator means including a plurality of individual moderator means disposed relative to the source in a stacked relationship and constructed of a particular material to reduce the energy in the neutrons from the source in an individual energy range of such neutrons.

24. A cavity structure as set forth in claim 23, including a first one of the individual moderator means being made from a non-chlorinated hydrocarbon material, a second one of the individual moderator means constituting heavy water, and a third one of the individual moderator means constituting graphite.

25. A cavity structure as set forth in claim 24, including shielding means disposed relative to the first moderator means, and having characteristics, for shielding the detector means from gamma rays passing through the first moderator means, shielding means disposed relative to the detector means for shielding the detector means from unwanted gamma rays, and means disposed adjacent the detector means and between the detector means and the object for providing for the detection by the detector means of only the gamma rays from nitrogen in the object.

26. A composite structure for detecting nitrogen in objects within a passageway in the cavity structure, the nitrogen in the object having properties of producing gamma rays when subjected to thermal neutrons of reduced energy, including neutron means disposed within the cavity structure for providing neutrons of high energy, first moderator means enveloping the neutron means and disposed within the cavity structure and following the contour of the cavity structure for reducing the energy in the neutrons in individual ranges and for providing for the introduction of the thermal neutrons of the reduced energy into the cavity structure, second moderator means disposed within the cavity structure and enveloping the first moderator means and following the contour of the cavity structure for receiving thermal neutrons of reduced energy and for providing for the movement of such thermal neutrons back into the cavity structure, detector means disposed in the cavity structure for detecting the gamma rays passing from the object to the detector means and for producing a signal in response to such detection, and means responsive to the signals from the detector means for indicating the concentration of the nitrogen in the object.

27. A composite structure for detecting nitrogen in objects within a passageway in the cavity structure, the nitrogen in the object having properties of producing gamma rays when subjected to thermal neutrons of reduced energy, including means disposed adjacent the cavity structure for providing thermal neutrons of high energy, first moderator means disposed relative to the thermal neutron means at a position adjacent the passageway for reducing the energy in the thermal neutrons in individual ranges and for providing for the introduction of the thermal neutrons of the reduced energy into the cavity structure, second moderator means disposed relative to the cavity structure for receiving thermal neutrons of reduced energy and for providing for the movement of such thermal neutrons back into the cavity structure, detector means disposed in the cavity structure for detecting the gamma rays passing from the object to the detector means and for producing a signal in response to such detection, and means responsive to the signals from the detector means for indicating the concentration of the nitrogen in the object, the second moderator means being made from a material with dimensions to minimize absorption of the thermal neutrons of the reduced energy, and means disposed relative to the second moderator means for absorbing the thermal neutrons passing through the second moderator means with the reduced energy.

28. A composite cavity structure for detecting nitrogen in objects within a passageway in the cavity structure, the nitrogen in the object having properties of producing gamma rays when subjected to thermal neutrons of reduced energy, including, a source of thermal neutrons of high energy, the source being located adjacent the cavity structure, first moderator means disposed at a position adjacent the cavity structure and disposed relative to the neutron source, and having characteristics, for reducing the energy in the thermal neutrons and providing for the movement of the thermal neutrons of reduced energy into the cavity structure, second moderator means disposed relative to the cavity structure and having characteristics for reducing the energy in the thermal neutrons passing through the cavity structure to the second moderator means and providing for the movement of the thermal neutrons of the reduced energy through the cavity structure to the object, and detector means for detecting the gamma rays produced by the nitrogen in the object as a result of the movement of the thermal neutrons of the reduced energy to the object, the first moderator means including a plurality of layers disposed relative to one another and to the thermal neutron means, and having individual characteristics, for reducing the energy in individual ranges in the thermal neutrons from the thermal neutron means.

29. A composite structure as set forth in claim 26, including a first one of the layers in the first moderator means being made from a non-chlorinated hydrogenous material, a second one of the individual layers in the first moderator means constituting heavy water, and a third one of the individual layers in the first moderator means being made from a hydrogenous material.

30. A composite structure as set forth in claim 27, including shielding means disposed relative to the first moderator means for absorbing the neutrons passing through the first moderator means.

31. A composite structure as set forth in claim 27, including shielding means disposed relative to the first moderator means for shielding the detector means from gamma rays passing through the first moderator means, and means disposed relative to the detector means for inhibiting unwanted gamma rays from affecting the response of the detector means.

32. A composite structure as set forth in claim 31, including means disposed relative to the detector means for providing for the detection by the detector means of only the gamma rays from the nitrogen in the object.

* * * * *